United States Patent [19]

Engels

[11] 4,277,993
[45] Jul. 14, 1981

[54] "ADJUSTMENT DEVICE FOR TOOL BIT HOLDERS"

[76] Inventor: George Engels, 551 Taylor Way, Belmont, Calif. 94002

[21] Appl. No.: 26,882

[22] Filed: Apr. 4, 1979

[51] Int. Cl.³ .................... B23B 29/06; B23B 29/10
[52] U.S. Cl. ...................................................... 82/37
[58] Field of Search ................... 82/37, 36 A, 36 R; 407/76, 83, 89

[56] References Cited

U.S. PATENT DOCUMENTS

| 709,693 | 9/1902 | Back | 82/37 |
|---|---|---|---|
| 1,193,945 | 8/1916 | Taylor | 82/37 |
| 2,364,329 | 12/1944 | Waldo et al. | 82/36 A |
| 2,366,079 | 12/1944 | Wilson | 82/36 A |
| 3,088,351 | 5/1963 | Schardt | 82/36 A |

FOREIGN PATENT DOCUMENTS

| 1237216 | 6/1960 | France | 82/37 |
|---|---|---|---|
| 72525 | 6/1916 | Switzerland | 82/36 R |
| 660683 | 11/1951 | United Kingdom | 82/37 |

*Primary Examiner*—Leonidas Vlachos
*Attorney, Agent, or Firm*—Julian Caplan

[57] ABSTRACT

Turret-type tool holders for metal lathes, especially when used for production, conventionally have no vertical adjustment for the individual tools (e.g. tool bits). To provide for such adjustment, a first member which rests on the base of the tool holder has an arcuate surface and a second member with complementary arcuate surface rests on the arcuate surface of the first member. The tool rests on the second member. Two conventional tool holder set screws engage the top of the tool to clamp the assembly in adjusted position. By tightening one screw and loosening the other, the tool and second member "rock" relative to the first member to adjust the elevation of the working tip of the tool.

1 Claim, 4 Drawing Figures

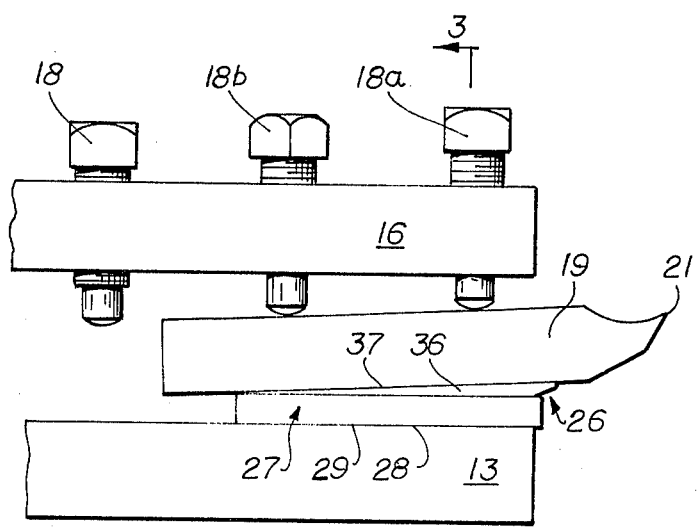
Fig. 2
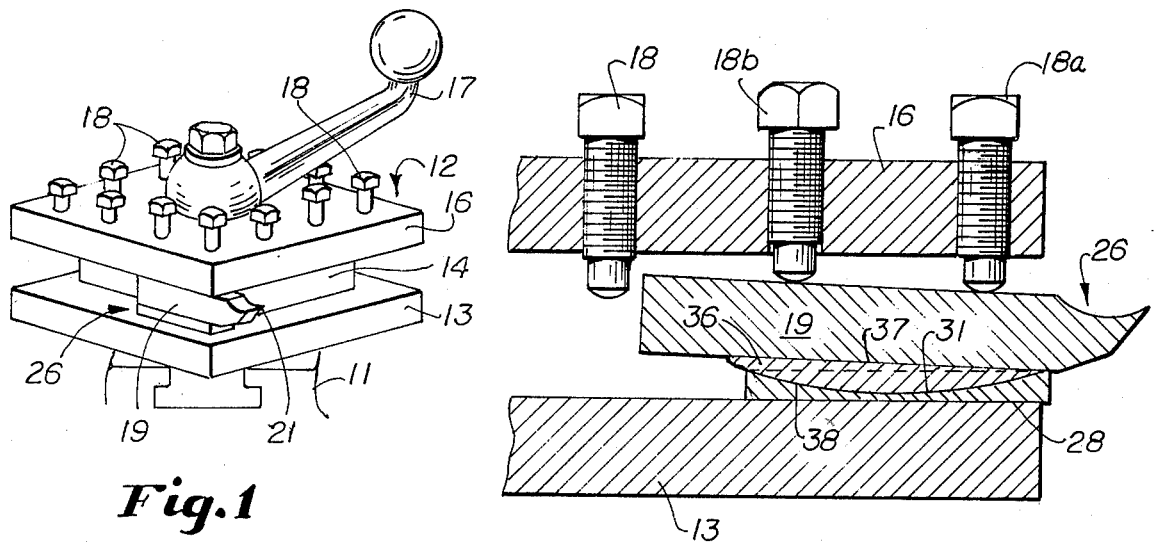
Fig. 1
Fig. 4
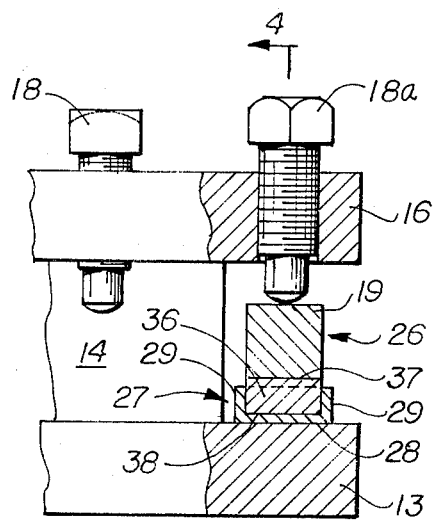
Fig. 3

"ADJUSTMENT DEVICE FOR TOOL BIT HOLDERS"

This invention relates to a new and improved height adjustment for tool holders of metal lathes. A principal purpose of the invention is to provide a convenient means for raising and lowering the working tip of the tool, thereby providing vertical adjustment relative to the work. A further purpose of the invention is to compensate for grinding the tool tip for sharpening or other purposes. A still further purpose of the invention is to adjust the rake of the tool as required.

Self-indexing tool post turrets have been used to facilitate production, eliminating cumbersome time-consuming work associated with single tool post and holders. However, vertical adjustment of the tool is not provided in conventional lathe turrets and some similar holders.

In accordance with the present invention, an adjustment device placed under the tool permits vertical adjustment merely by loosening one of the conventional set screws of the tool holder and tightening the other. Accordingly, when it is necessary to regrind a tool, the present invention may be used to adjust for the change of elevation of the tip of the tool which inherently occurs.

Tool holding devices such as turrets are ordinarily manufactured to hold tools of various sizes. If a smaller size tool is used, it must be shimmed. For example, on a $4\frac{1}{2}"$ tool post turret, the largest tool bit practically used is $\frac{3}{4}"$. Nevertheless, smaller tool bits are used very frequently and shims must be placed under the smaller bits so that the tip of the bit is at the level of the center of the work. Searching for shims of proper thickness or making new ones is time-consuming. Particularly is this so when grinding of bits is necessary for sharpening. The present invention eliminates the necessity for shimming.

One of the most undesirable features of shimming tool bits is that material of the thickness required may not readily be available. This requires that new shims be made. Rather than making a new shim, a machinist sometimes uses any piece of metal reasonably close to the requirement. Incorrect positioning of the tool results, which may cause production lags and poor finish on the work.

Adjustment of rake is sometimes made by experienced machinists. In accordance with the present invention, such rake adjustment is readily made.

The present invention is shown in the description which follows incorporated to hold a tool bit in a turret tool post. However, any lathe tool holding device using a similar method of clamping tool bits can also be used with this invention. Some quick change tool holders do provide for vertical adjustment, but still do not provide for rake changes.

Other objects of the present invention will become apparent upon reading the following specification and referring to the accompanying drawings in which similar characters of reference represent corresponding parts in each of the several views.

In the drawings:

FIG. 1 is a schematic perspective view of a portion of a turret lathe in which the present invention is installed.

FIG. 2 is a side elevational view in enlarged scale of a portion of the structure of FIG. 1.

FIG. 3 is a sectional view taken substantially along the line 3—3 of FIG. 2.

FIG. 4 is a sectional view taken substantially along the line 4—4 of FIG. 3 and showing the device used to change the elevation of the tip of a tool.

The present invention is intended for installation on a variety of different lathe tool post holders, particularly those used for production as distinguished from prototype work. The cross slide 11 of a conventional lathe turret is partially illustrated in FIG. 1. Mounted on the cross slide 11 is a tool holder 12. The tool holder is here shown to have four sides to accommodate four tools. The invention can be used with quick change tool post holders, or any other tool bit clamping device that uses a method of clamping tool bits similar to that of a tool post turret.

The tool holder 12 consist essentially of a base 13, a spacer 14 of lesser dimensions than the base 13 superimposed thereon and a top plate 16. By means not herein illustrated but well understood in the art, by loosening the handle 17 the tool holder 12 may pivot about a vertical axis relative to the slide 11, thereby sequentially bringing a plurality of tools into engagement with the work (not shown). As has been stated, the lathe and tool holder illustrated in FIG. 1 are merely illustrative of the environment for practice of the present invention.

As will be seen from the accompanying drawings, there is a space around the edges of the tool holder 12 between the base 13 and top plate 16 created by the spacer 14. A tool here shown as a tool bit 19 is held in this space by means of two of the plurality of conventional set screws 18 threaded into top plate 16. The size of the bit 19 is frequently less than the space between the members 13 and 16 and this creates problems in elevating the tip 21 of the bit 19 properly relatively to the work. Accordingly, an adjustment device 26 in accordance with the invention is used.

Adjustment device 26 comprises a first member 27 and a second member 36. As illustrated, the first member 27 is placed on the bottom. However, it will be understood that the members could be reversed. First member 27 has a flat bottom 28 which rests on the top of the base 13 in the position illustrated. Extending up from the base 28 are vertical sides 29. An arcuate surface 31 is ground down from the top of the first member 27. A suitable radius of curvature is about 3.218 inches. Typically a piece of heat treated steel $\frac{5}{8}" \times 2" \times 3/16"$ is milled out by a $\frac{1}{2}"$ wide cutter to produce a thickness of 0.031 at the center with 1/16" wide sides 29 at either side. The sides 29 are for strength and also to guide the first member 36 against lateral movement.

Second member 36, here shown has a top 37 and an arcuate bottom surface 38 which has the same radius of curvature as the surface 31. The second member 36 may be made of a piece of heat treated steel $\frac{1}{2}" \times 2" \times 0.21"$ thick at the center and approximately 1/16" thick at both ends. The member 36 may rock relatively to the member 26 as is seen by comparison of the positions of the tip 21 of the bit 19 in FIGS. 2 and 4.

In use, when a bit 19 which is smaller than the gap between the members 13 and 16 is used, the adjustment device 26 is placed on the bottom of the gap, resting on the top of the base 13. Either the member 36 or 27 may be uppermost. The bit 19 is placed on top of the uppermost of the two members. Set screws 18a and 18b engage the top of the bit 19. Referring to FIG. 2, the tip 21 is elevated substantially to maximum position. However, by backing off screw 18b and tightening 18a, the tip 21 may be lowered to the position of FIG. 4. Of course, any intermediate position may be selected.

When is is necessary to grind the tip 21, the position of the members 27 and 36 is adjusted by means of set screws 18a and 18b to compensate for the metal removed from the tip. Similarly, if the machinist wishes to adjust the rake of the bit 19, this may also be accomplished. What is claimed is:

1. For use in a lathe of the type having a tool and a tool holder, said tool holder having a base, a plate spaced from said base and clamping means operable for securing said tool in said holder between said base and said plate with the distal tip of said tool extending outward from said tool holder to engage the work, the improvement comprising tool height adjustment means entirely separate from said tool and said tool holder, said adjusting means comprising a first member having a planar first surface and an opposed second surface formed with an arcuate concavity, said first and second surfaces extending the entire length of said first member, parallel sides along the longitudinal edges of said first member extending above said second surface with a first space between said sides, the top edges of said sides being of substantially uniform elevation, and a second member having a planar first surface and an opposed convex second surface of the same radius of curvature as said second surface of said first member, said first and second surfaces of each second member extending the entire length of said second member and being substantially the same lengths as said first and second surfaces of said first member, said members being positioned with their second surfaces in contact and one said first surface fitting against said base, said tool resting on the other said first surface, said second member fitting in said first space and being restrained from lateral movement by said sides, said clamping means bearing against said tool, said second surfaces sliding relative to each other about the common center of the radius of curvature of said second surfaces, said tool being capable of rocking about said center so that the distal tip of said tool rises and falls in elevation relative to said base prior to said clamping means securing said tool in fixed position, said clamping means comprising first and second set screws threaded into said plate, each said set screw having an end in the second space between said plate and said base, each said end engaging said tool, said ends spaced longitudinally of said tool whereby when one said set screw is loosened and the other tightened, the angle between said first surfaces is adjusted and the elevation of said distal tip being correspondingly adjusted, said set screws being the sole means for securing said first and second members in desired positions of adjustment relative to each other and thereby adjusting the elevation of said distal tip relative to each base.

* * * * *